United States Patent [19]

Shiobara

[11] Patent Number: 5,065,397
[45] Date of Patent: Nov. 12, 1991

[54] DATA SYNCHRONOUS TRANSFER SYSTEM USING A FIBER DISTRIBUTED DATA EXCHANGE INTERFACE

[75] Inventor: Yasuhisa Shiobara, Hoya, Japan

[73] Assignee: Kabushiki Kaisha Toshiba, Kawasaki, Japan

[21] Appl. No.: 567,379

[22] Filed: Aug. 14, 1990

[30] Foreign Application Priority Data

Aug. 14, 1989 [JP] Japan .................................. 1-209783

[51] Int. Cl.$^5$ ............................................ H04L 12/00
[52] U.S. Cl. ..................................... 370/85.5; 370/84; 370/85.12; 370/85.15; 340/825.05
[58] Field of Search .................... 370/85.5, 85.4, 85.12, 370/60, 94.1, 85.15; 340/825.05

[56] References Cited

U.S. PATENT DOCUMENTS

| | | | |
|---|---|---|---|
| 4,766,530 | 8/1988 | Roslund | 340/825.05 |
| 4,845,709 | 7/1989 | Matsumoto et al. | 370/85.5 |
| 4,914,652 | 4/1990 | Nguyen | 370/85.5 |
| 4,932,023 | 6/1990 | Geyer et al. | 370/85.15 |
| 4,964,113 | 10/1990 | Geyer et al. | 370/85.5 |

Primary Examiner—Douglas W. Olms
Assistant Examiner—Dang Ton
Attorney, Agent, or Firm—Foley & Lardner

[57] ABSTRACT

This disclosure is for an improved data synchronous transfer apparatus configured from fiber distributed data interfaces (FDDI) provided with processing functions for synchronous services and asynchronous services are disposed at each node, where these nodes are connected via transfer paths into a ring shape and transfer synchronous data frames. In this system, each node that is a primary stations for synchronizing the set time of the synchronous data frames is provided with a synchronization signal generation circuit that generates a synchronization signal for each set time an external time signal is received from either itself or externally, a token detection circuit in order to detect the receipt of a token that rotates around a transfer path connected in a ring shape, a counter that counts down a predetermined value and that is reset for each generation of the synchronization signal, a frame length conversion circuit, that creates a dummy data frame having a time equivalent in length to a value remaining value on the counter at the time when there is the detection of the receipt of the token that has rotated around the ring-shaped transfer path and has returned, and a transfer control means that synchronizes the transfer start time of the synchronous data frame transferred from the node of the primary station with the set time by the transfer of the dummy data frame prior to the transfer of the synchronous data frame.

5 Claims, 4 Drawing Sheets

DATA SYNCHRONOUS TRANSFER SYSTEM USING A FIBER DISTRIBUTED DATA EXCHANGE INTERFACE

BACKGROUND OF THE INVENTION

The present invention relates to data synchronous transfer systems, and more particularly, to data processing apparatus comprising nodes provided to data processing apparatus or peripheral apparatus and disposed at a plural number of points which are mutually separated by a certain distance, and optical transfer cables connecting those control apparatus, and provided with a fiber distributed data exchange interface (hereinafter termed an FDDI) that can be used for optical local area networks to transmit/receive at either high speed or low speed, various types of data between said processing apparatus and/or control apparatus, and peripheral apparatus, and relates to data synchronous transfer methods that have circuit exchange functions such as the cyclic performing of data, exchange between control apparatus at a plural number of mutually remote locations, the simultaneous sampling of process data such as instantaneous values such as voltage, current and the like, at a plural number of mutually remote locations, the enabling of data transfer so that a plural number of computers and control apparatus are connected with all processing apparatus performing data processing in temporal synchronization, and that can transfer data such as the voice data necessary for cyclic transfer, and the like.

In recent years, local area networks (hereinafter, termed LAN networks) have been used at an increasing rate in many different fields. Amongst these fields, one that is attracting much attention in the field of next generation, high-speed and wide-area LAN are fiber distributed data exchange interfaces for which standardization has been defined by the American National Standards Institute (hereinafter, termed ANSI-FDDI). These ANSI-FDDIs use optical fiber as the transfer path and are 100 Mbps ring-shaped LAN that use the token passing method as the transfer control method. Although the ANSI has practically completed the standardization of the FDDI ratings, FDDI are being studied in the fields of the computers and communications industry since largescale integrated circuits (hereinafter, termed LSI) and protocol processing software in conformity with the FDDI ratings has come to be available from semiconductor manufacturers.

For example, one proposal has been for the use of FDDI to configure a packet exchange network so that data can be both sent and received at high speeds between multiple mainframe computers, between mass storage systems connected to mainframe computers, or connecting between mainframe computers and other peripheral equipment. Furthermore, these FDDI are thought to be capable of being used as backbone networks connecting between LAN systems for low-speed data transfer and receive such as in the case of the Ethernet and MAP (manufacturing automation protocol, hereinafter abbreviated MAP) systems and the like.

MAP is a communications protocol for the automization of factories and is the practical standard for LAN for factory automation purposes (known as FALAN). LAN using FDDI having a plural number of nodes mutually connected in a ring shape generally have various functions such as transfer path control functions that can stop transfer requests from each node, in accordance with the transfer region that can be used by the network and acquire transfer path usage rights, transfer and receive function for the data from each node, transfer system obstruction detection functions, obstruction portion separation functions, and transfer system reconfiguration functions, etc.

As has been described above, in token-passing LAN used for LAN having FDDI, transfer rights known as tokens are successively received between each of the nodes in the system to prevent a plural number of nodes from sending at the same time. These systems are configured so that data can be sent within a predetermined set time, by those nodes that have received tokens. Accordingly, it is possible to have definitive transfer path access and so this token passing method is used in MAP systems that require real time control.

It is necessary to use the wide-area characteristic of FDDI for the transfer of data which is a combination of voice data, image data and other types of data. For example, in the transfer of voice data, cyclic transfer for each multiple of time of 1/8 KHz 125 $\mu$sec is necessary in order to accommodate a voice band of 8 KHz and it is possible to transfer data cyclically using current FDDI that are based on the packet exchange method. However, in LAN systems that use current FDDI, because of cumulative errors, there is the problem of it not being possible to transfer the data that is necessary for the cyclic transfer of data such as voice data.

However, when a ring-shaped high-speed LAN using a FDDI is used to transfer data, it is desirable to develop a data transfer system that has the data packet exchange functions conventionally provided, and for it to additionally have circuit exchange functions such as the cyclic performing of data exchange between control apparatus at a plural number of mutually remote locations, the simultaneous sampling of process data such as instantaneous values such as voltage, current and the like at a plural number of mutually remote locations, the enabling of data transfer for so that a plural number of computers and control apparatus are connected with all processing apparatus performing data processing in temporal synchronization, and that can transfer data such as the voice data necessary for cyclic transfer, and the like.

SUMMARY OF THE INVENTION

An object of the present invention is for when a ring-shaped high-speed LAN using a FDDI which is the powerful standard for the next generation of high-speed and wide-area LAN, is used to transfer data, to provide the data packet exchange functions conventionally provided, and for it to additionally have circuit exchange functions such as the cyclic performing of data exchange between control apparatus at a plural number of mutually remote locations, the simultaneous sampling of process data such as instantaneous values such as voltage, current and the like at a plural number of mutually remote locations, the enabling of data transfer so that a plural number of computers and control apparatus are connected with all processing apparatus performing data processing in temporal synchronization, and that can transfer data such as the voice data necessary for cyclic transfer, and the like, all without losing the excellent reliability, self-recoverability and extendability that are the conventional characteristics of FDDI.

In order to attain the objective described above, the data synchronous transfer apparatus relating to the present invention is a data synchronous transfer apparatus X in which data processing apparatus having fiber distributed data interfaces provided with processing functions for synchronous services and asynchronous services are disposed at each node, and in which these nodes are connected via transfer paths into a ring shape and transmit and receive data, the data synchronous transfer apparatus relating to the present invention is characterized in that the nodes that are the primary stations for synchronizing the time of the synchronous data frames are provided with a synchronization signal generation circuit that generates a synchronization signal for each set time an external time signal is received from either itself or externally, a token detection circuit in order to detect the receipt of a token that rotates around a transfer path connected in a ring shape, and a counter that counts down a predetermined value and that is reset for each generation of the synchronization signal, a frame length conversion circuit, that creates a dummy data frame having a time equivalent in length to a value remaining value on said counter at the time when there is the detection of the receipt of said token that has rotated around said ringshaped transfer path and has returned, and a transfer control means that synchronizes the transfer start time of the synchronous data frame transferred from the node of the primary station with the set time by the transfer of the dummy data frame prior to the synchronous data frame.

According to the present invention, the method of transfer of data synchronized with a set time and using a LAN system using FDDI, special nodes in the LAN system are made primary nodes, and when these primary station nodes perform data frame transfer in agreement with a cyclically set time, the data frames of the primary stations are received at the nodes other than those special nodes, that is to say, at the nodes of the secondary stations, and it is possible to know the set time by calculating back from the time of receipt, so that it is possible to perform synchronization of the times for all nodes that are participating in the LAN system network. In the present invention, the nodes of the primary stations set a data frame that is to be transferred synchronous with the set time as synchronous data frame Ds, and the transfer start timing of the synchronous data frame Ds is made to coincide with the set time.

This is to say that in the present invention, the asynchronous service functions and the synchronous service function of FDDI are used so to transfer a fixed quantity of data constantly, and also to transfer a variable quantity of data in accordance with data transfer requests that generate suddenly, so that changes occur in the data frame transfer time at each node so that as a result, the token rotation time TRT changes at the nodes of the primary stations. Accordingly, it becomes necessary to have a source time adjustment means in order to transfer the synchronous data frames so that the nodes of the primary station are in agreement with the set time.

In order to do this, that is to say, to make the transfer start time of the synchronous data frame Ds by the primary node in agreement with the set time, or in other words, to achieve synchronization and cyclically transfer the synchronous data frames, and in order to transfer for each time cycle Th set so as to accommodate all of the data that is to be transferred and without there being any cumulative error, the dummy data frame Dm is set prior to the sending of a synchronous data frame Ds when there is the receipt of a token that has made one rotation. When this occurs, the data length of the dummy data frame DM that is to be transferred is determined in that the data length of the dummy data frame Dm that is to be sent is adjusted in accordance with the set time at which the synchronous data frame is to be transferred and the time difference. The dummy data frame Dm for which this has been done is transferred prior to the transfer of the synchronous data frame Ds, and then the synchronous data frame Ds is transferred, the transfer start time of the synchronous data frame Ds is made in agreement with the set time, that is to say, it is synchronized and transferred cyclically. Here, the data length of the dummy data frame Dm is adjusted for each time and doing this controls the transfer start time of the synchronous data frame Ds that is transferred from the node of the primary station so that it becomes the set time, and cumulative time errors are thus cancelled.

Moreover, when this occurs, the total amount of data that is transferred using the synchronous service and the asynchronous service within the set time cycle Th is limited to the value that can transfer the dummy data frame Dm for the adjustment of the transfer start time of the synchronous data frame Ds.

As has been described above, according to the data synchronous transfer method of the present invention, when a token that has made one rotation is received at a node, and when there is a time discrepancy with respect to the set time, of the transfer time of a synchronous data frame that is to be transferred, a dummy data frame having a length according to the time difference with the set time for the transfer of the synchronous data frame is transferred so that in addition to the data packet exchange functions conventionally provided for ring-shaped high-speed LAN using FDDI, it is possible to provide the data packet exchange functions conventionally provided, and for it to additionally have circuit exchange functions such as the cyclic performing of data exchange between control apparatus at a plural number of mutually remote locations, the simultaneous sampling of process data such as instantaneous values such as voltage, current and the like at a plural number of mutually remote locations, the enabling of data transfer for so that a plural number of computers and control apparatus are connected with all processing apparatus performing data processing in temporal synchronization, and that can transfer data such as the voice data necessary for cyclic transfer, and the like, all without losing the excellent reliability, self-recoverability and extendability that are the conventional characteristics of FDDI.

BRIEF DESCRIPTION OF THE DRAWINGS

In the appended drawings.

DETAILED DESCRIPTION OF THE PREFERRED EMBODIMENTS

The following is a description of preferred embodiments of the present invention, with reference to the appended drawings.

First is a description of the outline of an FDDI. LAN using FDDI have the two types of services of a synchronous service and an asynchronous service. When a token is received from a node, the synchronous service can send the received token and a synchronous frame at any time. On the other hand, with the asynchronous service, the nodes can send an asynchronous frame that is not synchronized with the receipt of the token, only when the tokens are circulating sufficiently quickly.

Figure 1:
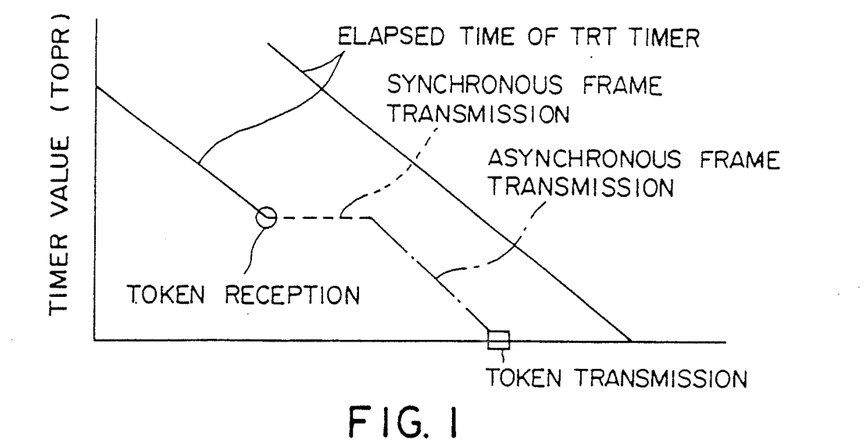
FIG. 1 is a characteristics diagram indicating the transfer timing of the tokens and the transfer of the synchronous frame for the data that is transferred by the synchronous transfer apparatus of the present invention.
Figure 2:
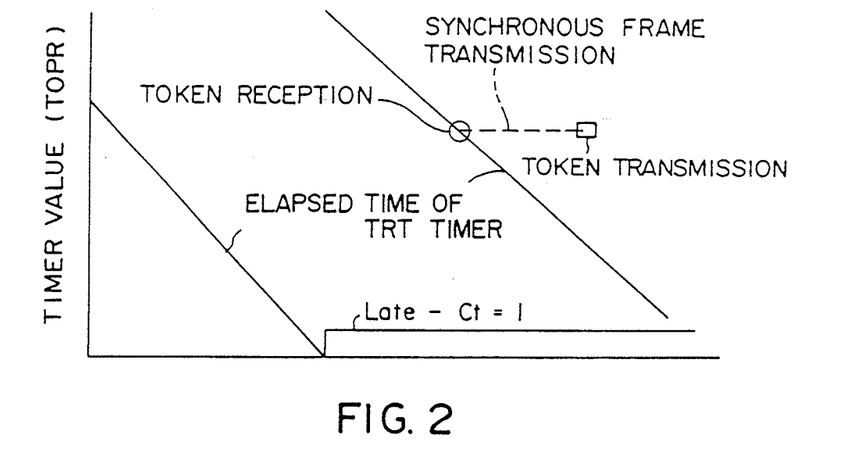
FIG. 2 is a characteristics diagram indicating the transfer timing of the tokens and the transfer of the asynchronous frame for the data that is transferred by the synchronous transfer apparatus of the present invention.

This is described for one example of the token transfer timing and the transfer of the synchronous frame and the asynchronous frame, with reference to FIG. 1 and FIG. 2. Normally, one portion of the initialization process for ring-shaped LAN using FDDI, has each of the nodes set to target token rotation times (hereinafter, termed TTRT) in order to determine the target time that it takes a token to go around the ring-shaped LAN. This value for the TRRT is the minimum value (hereinafter, termed the TOPR) for the speed from the values that have been requested in order for each of the nodes to sufficiently support the synchronous traffic requests, and this TOPR value is set as the TTRT value in the token rotation timer (hereinafter, termed the TRT) for each of the nodes. When a time equivalent to the TOPR value set in the timer TRT described above has elapsed, that is, when the TOPR value had been decremented to "0", the value is inverted to "1" and the late counter that is disposed in each of the nodes is cleared each time a token is received. This is to say that when another token is received by a node before the TOPR value set in the timer TRT after a token has been previously received by that node is cleared (i.e., when the late counter is "0"), the token is regarded as having arrived at the node within the target time. When a token arrives at times other than this it is regarded as being delayed.

Here, when a token has arrived at a node within a predetermined target time, that is to say, when the token is going around sufficiently fast, the current value in the timer TRT is reset to the TOPR value and the timer TRT is restarted. When this is done, after the synchronous frame has been sent by the token receive, it is possible for the transfer of the asynchronous frame in the time equivalent to the above described current value set in the timer TRT. The token is passed to the next node when this current value set in the timer TRT has elapsed, and when there is no asynchronous frame that is to be sent. Moreover, when the token is delayed and arrives at the node after the previously described target time has elapsed, the timer TRT is not reset irrespective of whether the rate counter is reset. In this case, the transfer of only synchronous frames is permitted and the token is passed to the next node after the transfer of the asynchronous frame has been completed.

As has been described above, in LAN having FDDI, the two services of a synchronous service that sends synchronous frames, and an asynchronous service that sends synchronous frames are performed.

Figure 3:
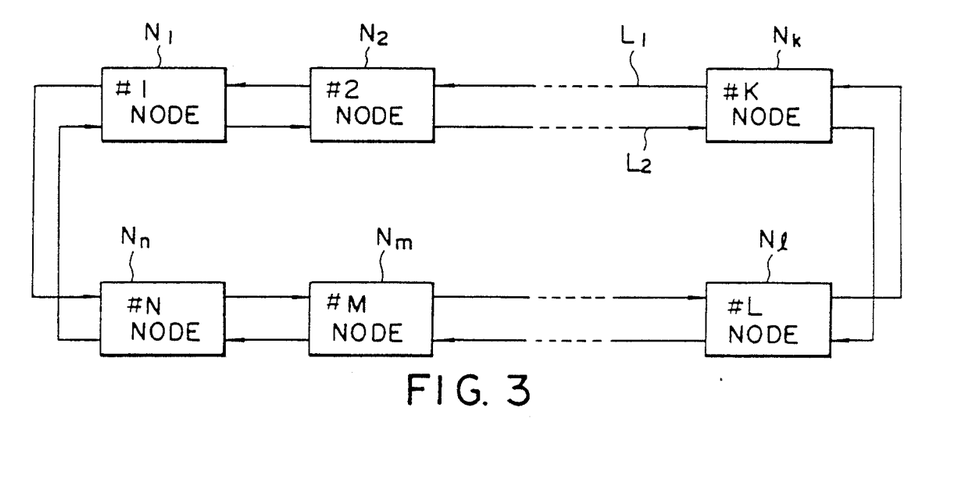
FIG. 3 is an outline diagram indicating an example configuration of a LAN system configured using the synchronous transfer apparatus of the present invention.
Figure 4:
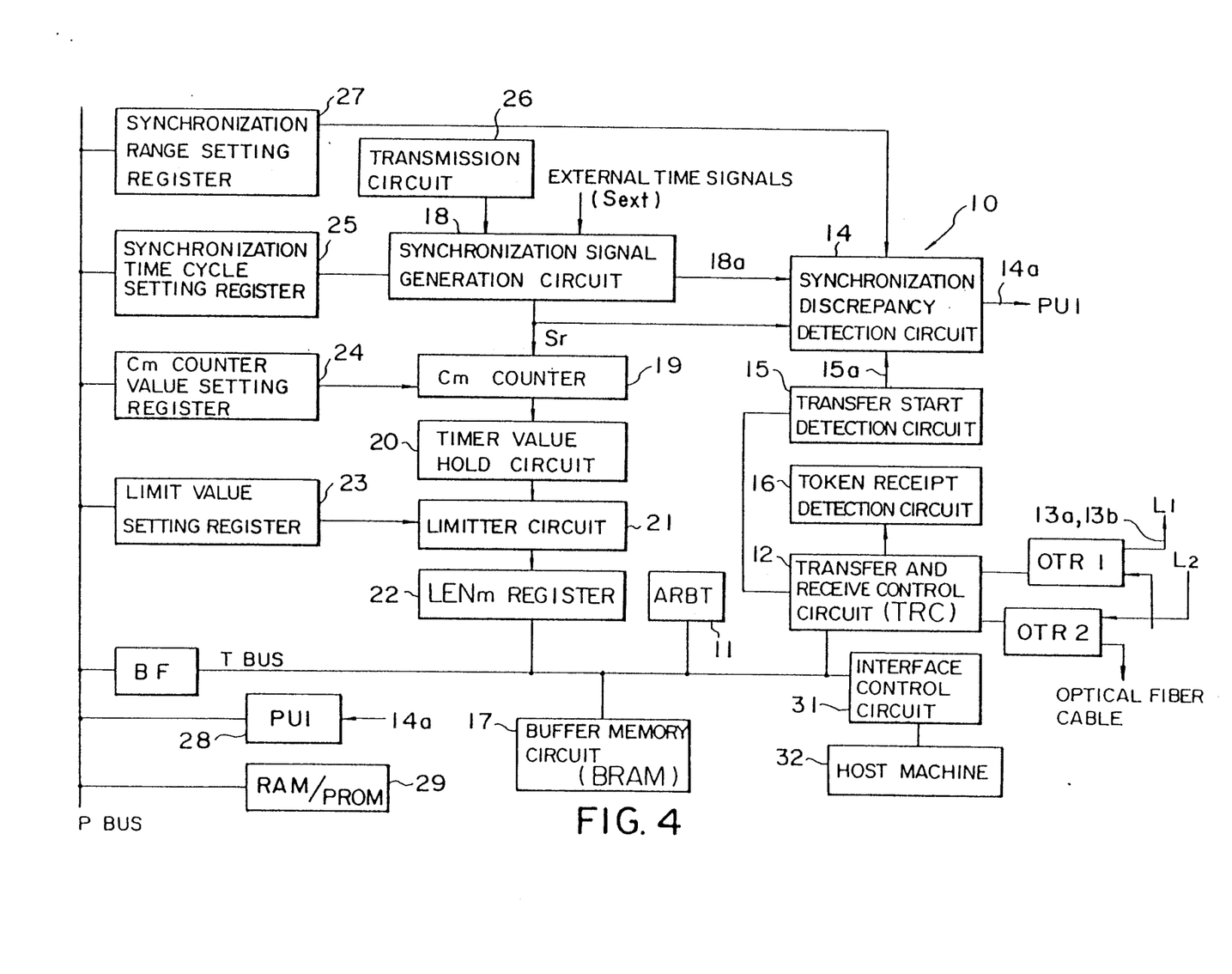
FIG. 4 is a block diagram indicating the configuration of a processing apparatus in a synchronous transfer apparatus according to a first embodiment of the present invention at each node.

The following is a detailed description of the data synchronous transfer apparatus relating to the present invention and which is applied to a LAN having the FDDI described above. As is indicated in FIG. 3, a number from #1 to #n of nodes $N_1$ through $N_n$ are mutually connected by two optical fiber cables $L_1$ and $L_2$ so that the directions of the transfer data flows oppose each other. Each of these #1 to #n nodes $N_1$ through $N_n$ are configured by a transfer control unit 10 that controls the data transfer, and a host apparatus 30 that connects them. One example of this transfer control unit 10 is as indicated in FIG. 4. The transfer control unit 10 is provided with an arbitration circuit (ARBT) 11, a transferring and receiving control circuit (TRC) 12, optical transceivers (OTR1, OTR2) 13a, 13b, a synchronization discrepancy detection circuit 14, a transfer start detection circuit 15, token receipt detection circuit 16, a buffer memory circuit (BRAM) 17, a synchronization signal generation circuit 18, a Cm counter 19, a timer value hold circuit 20, a limiter circuit 21, a LENm register 22, a limit value setting register 23, a Cm counter value setting register 24, a synchronization time cycle setting register 25, a transmission circuit 26, a synchronization range setting register 27, a microprocessor 28 for the FDDI and a memory circuit 29 for the program. In addition the host machine 30 is connected to the transfer control unit 10 via an interface control circuit 31.

The data transfer and receiving control circuit 12 is a circuit that controls the transfer and receiving of data on the basis of the FDDI ratings, and this data transfer and receiving control circuit 12 is a circuit with a configuration equivalent to the Am79C81A Am79C82A, Am79C83, Am7984A and Am7985A of the American company AMD.

The optical transceivers 13a and 13b are for the transfer and receiving of data to and from the transfer path. The synchronization discrepancy detection circuit 14 detects synchronization discrepancies between the transfer start signal 15a input from the transfer start detection circuit 15 and the synchronization discrepancy detection signal 18a amongst the external time signals output from the synchronization signal generation circuit 18 and sends the detection signal 14a to the microprocessor 28 for the FDDI as an interrupt signal when a discrepancy is detected.

The transfer start detection circuit 15 is a circuit for detecting the transfer start of transfer data from the transferring and receiving control circuit (TRC) 12, to the transfer path.

The token receipt detection circuit 16 detects the receipt of a token and therefore the buffer memory circuit (BRAM) 17 stores the transfer data that is sent and received. The synchronization signal generation circuit 18 is provided at each node which is a primary station and the external time signals $S_{ext}$ that are externally input, or the timing signals from the transmission circuit 26 are input to it, and the synchronization signals $S_r$ that become the standard are generated. These synchronization signals $S_r$ are detected when the external time signals $S_{ext}$ are received externally, and the external time signals $S_{ext}$ are detected when there is no longer the set cycle $T_h$ that has been set beforehand. When this is detected, the synchronization signal generation circuit 18 outputs synchronization discrepancy abnormality detection signals, that is, the synchronization discrepancy detection signals 18a, and also has a function to generate synchronization signals having the set cycle $T_h$, by itself and so these synchronization signals $S_r$ that have been internally generated are used for reference timing of the transfer start time of the synchronization data frame that the primary node is to transfer.

The Cm counter 19 is reset for each synchronization signal $S_r$ from the synchronization signal generation circuit 18 and also counts down the set cycle $T_h + a$ that is set by the Cm counter value register to be described later, and therefore, this set cycle $T_h + a$ is controlled so that it is generated for each set cycle $T_h$ (and which changes by set cycle $T_h \pm \Delta$ where there is tracking of the external synchronization signal) and so is a time larger than the synchronization signal $S_r$ by the time a. This is to say that the Cm counter 19 there is no overcount for the set cycle $T_h$ (Refer to FIG. 5.)

The timer value hold circuit 20 holds and stores the count value that was counted down by the Cm counter 19 at the timing of the receipt of the token, and the timer value hold circuit 20 which is the frame length conversion circuit converts the time value equivalent to the count value of the Cm counter 19 and which is held and stored in the timer value hold circuit 20, into the dummy data frame and also places a limit on the conversion length of this dummy data frame.

Figure 6:
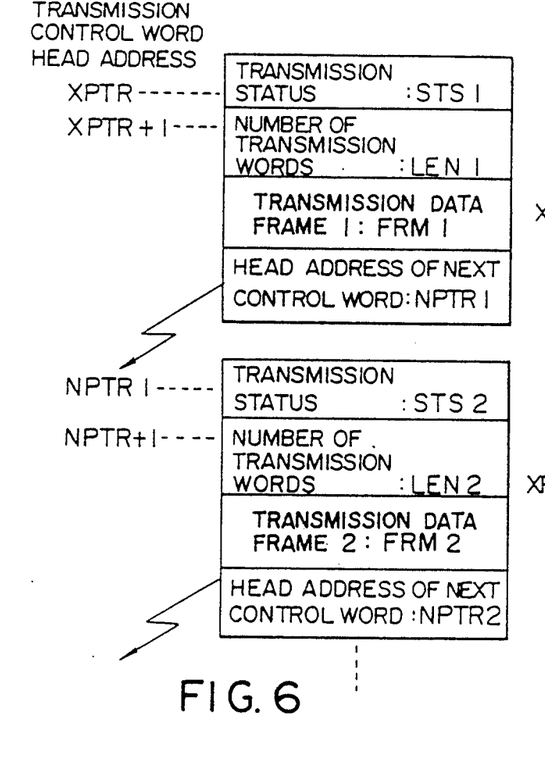
FIG. 6 is a diagram of a configuration of a transfer control word used in the synchronous transfer apparatus of the present invention.

The LENm register 22 gives the number of words for transfer for the transfer control word indicated in FIG. 6 and corresponding to the delimited frame length from the limiter circuit 21 and so the limit value setting register 23 sets the limit value of the limiter circuit 21. The Cm counter value setting register 24 is for setting the count value equivalent to the previously described set cycle $T_h + a$ in the Cm counter 19, and the synchronization time cycle setting register 25 is for setting the cycle time value in the synchronization signal generation circuit 18.

The transmission circuit 26 gives a timing signal for the set time, to the synchronization signal generation circuit 18 and so the synchronization range setting register 27 is for setting the detection range value for the synchronization discrepancy of the synchronization discrepancy detection circuit 14. The microprocessor 28 for the FDDI governs the transfer control of the data and therefore the memory circuit 29 for the program is for giving the program for the data transfer, to the microprocessor 28 for the FDDI, and the interface control circuit 31 is for controlling the interface between the host machine 30 connected to the nodes.

Moreover, the arbitration circuit (ARBT) 11 performs the stop of access rights when there the host machine 30 and the transferring and receiving control circuit (TRC) 12, and the P-bus side connected to the microprocessor 28 for the FDDI, access to the buffer memory circuit (BRAM) 17 that stores the data for send and receive.

Figure 7:
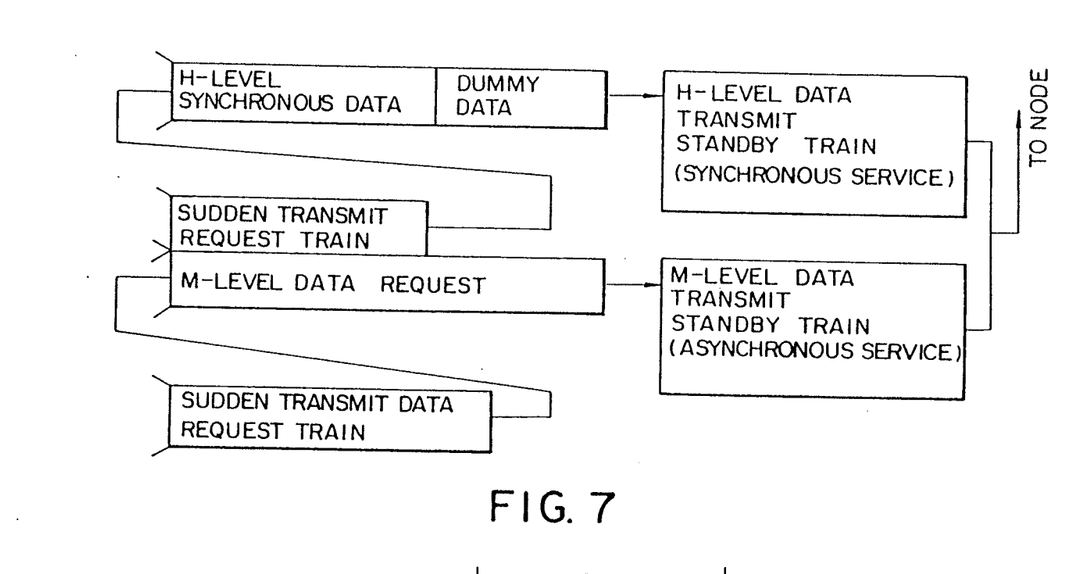
FIG. 7 is a diagram indicating one example of a data transfer standby trains for the synchronous and asynchronous services used in the synchronous transfer apparatus of the present invention.

In a data synchronous transfer system of the present invention and which is performed by LAN provided at each node with transfer control portions having the configuration described above, the total amounts of data of the entire LAN system having an FDDI and a synchronous service for the transfer of H (high-speed) level synchronous data and an asynchronous service for the transfer of M (low-speed) level asynchronous data, are made dh and dm respectively, and the time necessary for their respective transfer, that is the times taken by the data as transfer data frames on the LAN are made $T_{dh}$ and $T_{dm}$. However, in this case, there is also the time taken on the transfer path for the tokens to be passed between nodes. In addition, the times $T_{hm}$ and $T_{mm}$ are respectively the times necessary for the transfer of data of the M level and the synchronous data of the H level and for which sudden transfer requests have been generated using the asynchronous service and the synchronous service, and the time $T_h$ is the set cycle time determined by a method to be described later. (Refer to FIG. 7.).

Figure 8:
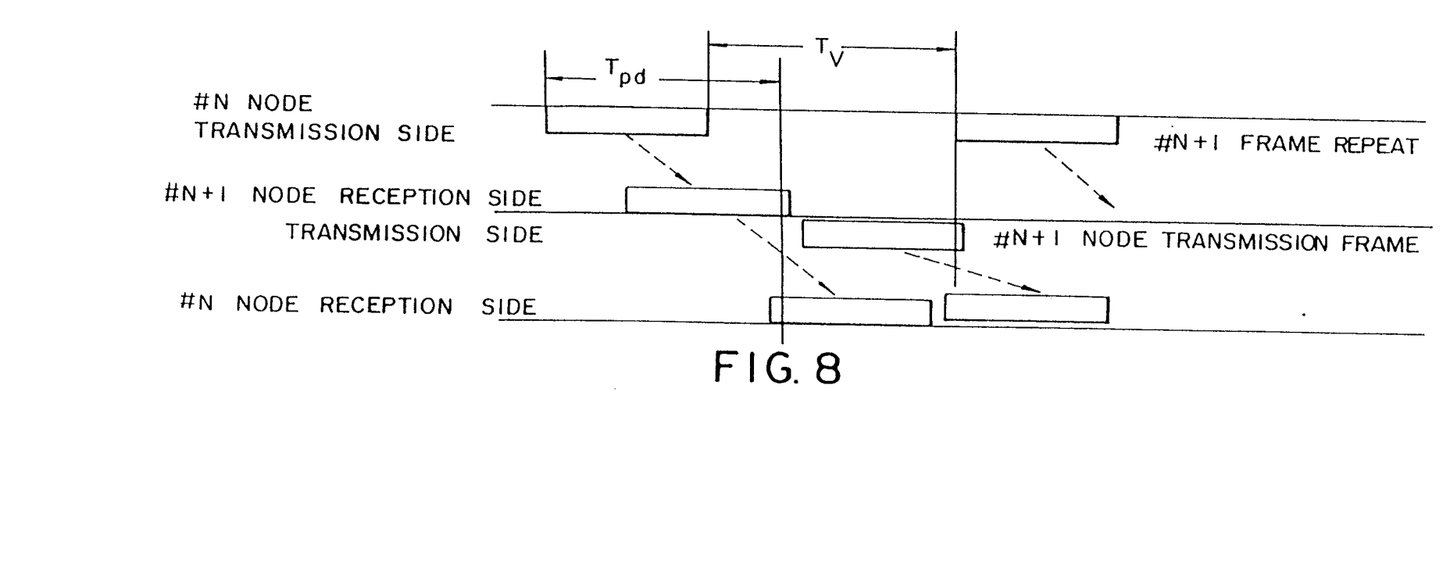
FIG. 8 is a timing chart indicating the transfer delay time determined by the system configuration of the synchronous transfer apparatus of the present invention.

In addition, the time $T_v$ means a vacant time when there is no data on the transfer path and is determined by the length of the cable around the ring, or by the number of times data is relayed for each node in the LAN. The vacant time $T_v$ on an optical fiber transfer path is determined as indicated in FIG. 8, by the transmission delay time required for a transferred data frame to make one rotation around the ring. The following is a further description of the vacant time indicated by $T_v(i)$. The propagation delay time $T_{pd}$ ($=T_v$) required for one rotation around the ring is the total sum of the time required for the data frame to be processed at each node, the relay time when there is relaying, and the data frame transfer delay when the data frame is transferred on an optical fiber transmission path. Thus:

$$T_v = T_{pd} = \Sigma j2 \cdot [T_{sa}(i) + T_{fb}(i, j+1)]$$

Here, $T_{sa}(i)$ is the data frame relay delay at the node i, and $T_{fb}(i, J=1)$ is the data frame transmission delay of the optical fiber transmission path for the one interval between node j and node j+1.

In such a relationship, in the present embodiment, when $T_{n1}$, $T_{n2}$ are made the time required to transmit the dummy data frame, there are the following relationships with the previously described set cycle $T_h$.

$$T_h = T_{dh} + T_{dm} + T_v + T_{n1} \quad \ldots (1)$$

or $$T_h = T_{dh} + T_{dm} + T_v + T_{hm} + T_{mm} + T_{n2} \quad \ldots (2)$$

$$T_{n1} > T_{n2} \quad \ldots (3)$$

Here, the time $T_{hm}$ for the transfer of the synchronous data of the H level and for which there was sudden transfer request by the synchronous service, is limited by the data lengths transferred at each node, and the time $T_{mm}$ for the transfer of the asynchronous data of the M level and for which there was sudden transfer request by the asynchronous service, is limited by the data lengths transferred at each node, and the token rotation time specified by the asynchronous service is also the set cycle time $T_h$ or less. From the relationships described above, the total number of data transferred using the asynchronous service and the synchronous service within the set cycle time $T_h$ and the dummy data frame Dm for adjusting the transfer time of the synchronous data frame can therefore be transferred. In the data synchronous transfer method of the embodiment described above, the LAN uses an FDDI and in this LAN, the controlling the transfer of the data frame at the transferring and receiving control circuit (TRC) 12 involves setting the transfer controlword that specifies and controls each of the data frames that are to be sent as indicated in FIG. 6, in the buffer memory circuit (BRAM) 17 and then using this to perform transfer operation for the data. When this is done, a data portion that is actually to be transferred and the length of the data frame to prepare the transmission with respect to the transferring and receiving control circuit (TRC) 12 are specified and then, the presence or absence of a data frame that is to be sent is next specified and if there is such a data frame, then the transfer of the data is controlled by specifying a position of that information on the buffer memory circuit (BRAM) 17. Here, the dummy data frame is a data frame for initial transfer upon the receipt of the token and so the LEN 1 within the transfer control word indicated in FIG. 6 becomes LENm as the number of words to be transferred. This is to say that the memory address of the output of the frame length conversion circuit becomes memory address XPTR+1 which specifies LENl in FIG. 6. Furthermore, in the configuration of a transfer data frame indicated in FIG. 9 for determining the length of the dummy data frame by LENl, the dummy data of the data portion is a value that indicates the head address of all of the following transfer control words. Accordingly, after the completion of transfer of the dummy data frame $D_m$, the following data frame, that is to say the synchronous data frame $D_s$ is transferred in accordance with the set transfer control word (Refer to FIG. 5).

In order to control the transfer of the data frames transferred at each node, in the data synchronous transfer system of the present invention and that performs control of the transfer of data frames transferred at each node, by having a buffer memory circuit (BRAM) 17 in which the transfer control words such as those described above are set, at each node, then the synchronous range value is set in the synchronization range setting register 27 at the primary nodes that receive the external time signal $S_{ext}$ from those external signals received by each node, the set cycle $T_h$ is set in the synchronization time cycle setting register 25, the Cm counter value $T_h+a$ is set in the Cm counter value setting register 24, and the limit value is set in the limit value setting register 23.

Here, when a node which is a primary node detects the receipt of a token by the token receipt detection circuit 16, the value remaining in the Cm counter 19 which has been counting down until that time, is held in the timer value hold circuit 20, stored, and output to the limiter circuit 21. In the limiter circuit 21 which is the data frame conversion means, a time value equivalent to the value remaining in the Cm counter 19 is converted to the data frame length and a limit is placed on the conversion length. The output value of the limiter circuit 21 becomes the data length of the dummy data frame $D_m$ and is given as the synchronization number Of transfer words LENm (where of course, the memory address of LENm at this time has been specified), for transfer control words in the 1st synchronous transfer service of the transferring and receiving control circuit (TRC) 12, provided with synchronous service and asynchronous service processing functions, so that the transferring and receiving control circuit (TRC) 12, sends the dummy data frame $D_m$ with the data length of LENm.

When this is done, the transferring and receiving control circuit (TRC) 12 starts the transfer of the dummy data frame $D_m$ with the data length LENm when the receipt Of the token is completed. This is to say that the dummy data frame having a frame length of the timing cycle from the receipt of the token until the transmission of the synchronous data frame Ds is sent and, as a result, the transfer start timing of the synchronous data frame that is to be sent next is in agreement with the set time.

In addition, when this occurs, the dummy data length converted by the limiter circuit 21 has a limit placed upon it and when there is an extreme discrepancy with the cycle, the dummy data frame length is limited to a constant value. Accordingly, when there is an extreme discrepancy with the cycle, the transfer start time for the synchronous data frame is compensated not by one compensation, but by making it synchronous after several set cycles $T_h$. In addition, when token receive has been generated close to a time that has been set beforehand, the output value of the limiter circuit 21 determines the length of the optimum dummy data frame and synchronous compensation is performed immediately.

Moreover, at the primary station node, as has been described above, when there the input of the external time signal $S_{ext}$ from eternally, to the synchronization signal generation circuit 18 and when the external time signal detects an abnormality, or when the transfer start time of the synchronous data frame Ds is compared with the synchronization signal $S_r$ and there is an extreme discrepancy, then the synchronization discrepancy detection circuit 14 detects a synchronization discrepancy and these detection results are sent as interrupt signals to the microprocessor 28 for the FDDI and an indicator that indicates a discrepancy within the synchronous data frame is set and sent to inform all nodes other than the primary station node so that the control operation of nodes other than the primary station can be regulated.

In this manner, in the embodiment described above, the Cm counter that counts the time equivalent to the set time cycle is used so that when the synchronous data frame is synchronized to the set time and transferred, then as soon as the node of the primary node has received a token, that receipt time discrepancy is detected as a remaining value of the Cm counter and the time error with respect to the set time detected. This remaining value is directly converted by the software into a dummy data frame length so that it is possible to perform synchronization compensation without time delay. As a result, even in similar transfer apparatus that uses a packet exchange method such as the FDDI transfer method can have transfer at a set time and without there being any cumulative errors, and it becomes possible to have transfer of the data necessary for set cycle characteristics such as voice transfer.

The following is a description of the format of a data frame which is placed on the transfer path, with reference to the table below.

TABLE

[PA][SD][FC][DA][SA]<DSAP><SSAP><C><WN><ADRS><DATA0 to DATAn>[FCS][ED][FS]

| | |
|---|---|
| SD, ED | start delimiter, end delimiter |
| FC | frame control |
| DA, SA | destination node address, source node address |
| DSAP, SSAP | destination service access point, source service access point |
| C | command |
| WN | number of words |
| ADRS | common memory head address |
| DATA0-n | transfer data |
| FCS | ANSI-CRC32 frame check sequence |
| FS | frame status |

Figure 5:
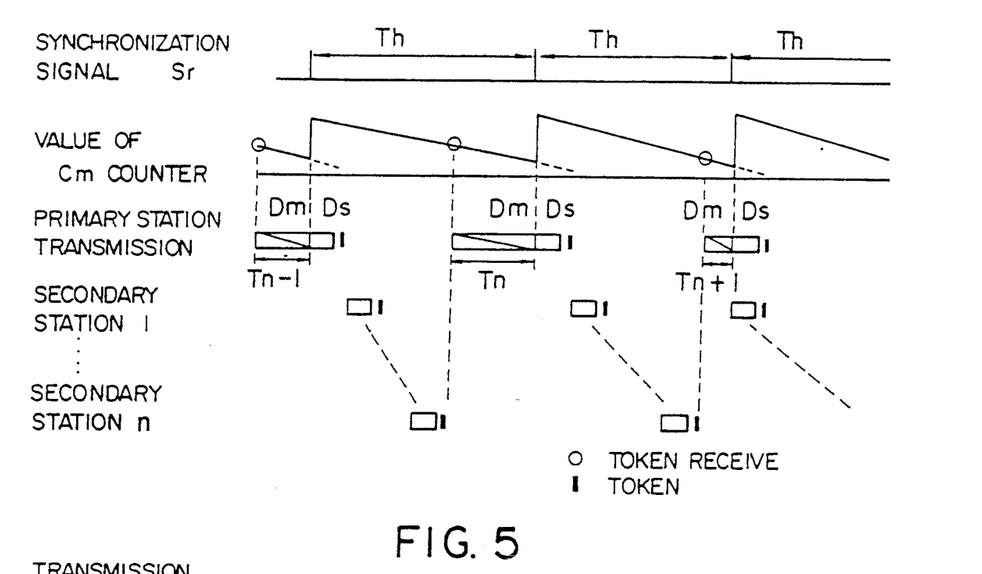
FIG. 5 is a chart indicating the transfer timing of data from the processing apparatus indicated in FIG. 4, to a transfer path.

This table indicates an example of the format of an actual data frame that is placed on the transfer path, and relates to the data frame train of FIG. 5 that is transmitted on the transfer path by the data processing apparatus of the present invention. In this table, the start of the data frame is indicated by the pre-amble PA and the start delimiter SD, and then the frame control FC allows the identification of the data frame level, that is to say, whether there is a synchronous service or an asynchronous service. Then the destination node address DA and the start node address SA specified the node addresses in the multicase address format and the destination service access point DSAP and the start service access point SSAP and the command C specify the transfer data frame of the present invention.

Figure 9:
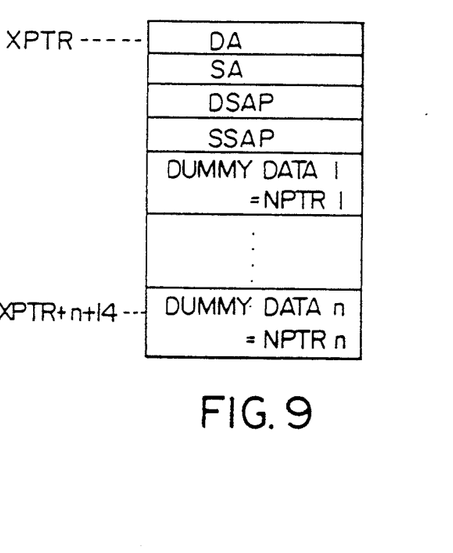
FIG. 9 is a diagram indicating the example of a data configuration for a timing data transfer frame used in the data synchronous transfer method of the present invention.

Moreover, the number of words WN corresponds to the dummy data 1 through dummy data n indicated in FIG. 9, and the buffer memory head address is specified as the next transfer data frame, that is to say, as the head address of the synchronization data frame that is to be sent next. Then, the transfer data that is to be transferred, is specified from synchronization data frame DATA0 to DATAn and the frame check sequence is specified by ANSI-CR32. Moreover, the end delimiter ED indicates the end of the frame and FS specifies the frame status for the following data frame.

Moreover, in the embodiment described above, the description was for the case when an optical fiber was used as the transfer path but the present invention is not limited to this, as a coaxial cable or radio transfer can be used separately as indicated in FIG. 3 or these means can be used in conjunction with optical fiber cables.

Still furthermore, in the embodiment described above, the data synchronous transfer method was described in terms of the nodes of the primary stations but in secondary stations which are not primary stations, the detection of the receipt of synchronous data frames that have been transferred from a node that is a primary station can reproduce the synchronization data frame by calculating back from that time of receipt. This is to say that the synchronization signal reproduction circuit realizes a PLL (phase lock loop) for the nodes of the secondary stations and with the exception of the node of the primary station so that it becomes possible for a single time to be shared by the entire LAN system, and so that it is possible to execute data processing at each node and using a single reference time.

Furthermore, in this embodiment, there is number n of dummy data as indicated in FIG. 9 in the data configuration for the dummy data frame but in a method using a number LENm of data, the transmission and receiving control circuit starts the transfer of the dummy data frame and when the transfer data has been read from the buffer memory, increments the memory address one by one so that the memory address that reads the number LENm of data enables a reduction in the amount of memory to store the dummy data frame transfer data.

What is claimed is:

1. In a data synchronous transfer apparatus in which data processing apparatus having fiber distributed data interfaces provided with processing functions for synchronous services and asynchronous services are disposed at each node, and in which these nodes are connected via transfer paths into a ring shape and transfer synchronous data frames, said data synchronous transfer apparatus characterized in that the nodes that are primary stations for synchronizing a predetermined time of said synchronous data frames comprise:

synchronization signal generation means for generating a synchronization signal each time when a time signal is received from either itself or external nodes;

token detection means for detecting the receipt of a token that rotates around a transfer path connected in a ring shape;

counter means for counting down a predetermined value and being reset for each generation of said synchronization signal;

frame length conversion means for creating a dummy data frame having a time equivalent in length to a value remaining value on said counter means at the time when there is the detection of the receipt of said token that has rotated around said ring-shaped transfer path and has returned; and transfer control means for synchronizing a transfer start time of said synchronous data frame which is transferred from the node of said primary station with the predetermined time by the transfer of said dummy data frame prior to said synchronous data frame.

2. The data synchronous transfer system of claim 1, wherein:

a limit circuit provides a limit value to the data length of the converted dummy frame to limit it to a constant value so that when there is an extreme discrepancy in synchronization of a synchronous data frame that is to be transferred at said set time, the transfer start time for said synchronous data frame is not compensated once, but by dividing the compensation amount over a plural number of several cycles, and when there is a small discrepancy in the synchronization of the data frame that is to be transferred at said set time, by performing immediate compensation for synchronization.

3. The data synchronous transfer system of claim 1, wherein:

said frame length conversion means creates a dummy data frame equivalent to the time difference between said synchronization signal generated for each said set time, and a transfer start time of said synchronization data frame.

4. The data synchronous transfer system of claim 1, wherein:

said transfer control means, comprises:

a buffer memory that sets a transfer control word to specify and control each transfer data frame that is to be sent, and a transmission and receiving control circuit that specifies this data frame length and a data portion that is to be actually sent, specifies the presence or absence of a data frame to be sent following it, and when there is a data frame, specifies a specification value to indicate a position on said buffer memory on which that information exists.

5. The data synchronous transfer system of claim 1, wherein:

each node is additionally configured from;

an internal bus supplied with control signals to control data transfer;

a synchronous time cycle setting register provided between this bus and said synchronization signal generation circuit, to set a time value for a set cycle time with respect to this generation circuit;

a counter provided between said bus and counter, and that sets a count value to which a constant time is appended, to a cycle time of this counter;

a limit value setting register provided between said bus and said limit circuit as a frame length conversion means, and that sets a limit value for this limit circuit;

a synchronous range setting register connected to said bus, and that sets a range of synchronization discrepancy of said synchronization data frame, a transfer start detection circuit connected to a transmission and receiving control circuit configuring said transfer control means, and that detects start of data transfer from this control circuit and with respect to a data transmission path such as an optical fiber, for example, and a synchronization discrepancy detection circuit that detects synchronization discrepancies between said transfer start signal and said synchronization discrepancy detection signal on the basis of transfer start signals output from said transfer start detection circuit, a detection range value output from said detection range setting register, synchronization discrepancy detection signals output from said synchronization signal generation circuit, and synchronization signals output from this signal generation circuit.

* * * * *